Oct. 21, 1958
J. W. JOHNSON
2,856,678
RING LOADING FIXTURE
Filed Nov. 9, 1954
3 Sheets-Sheet 3
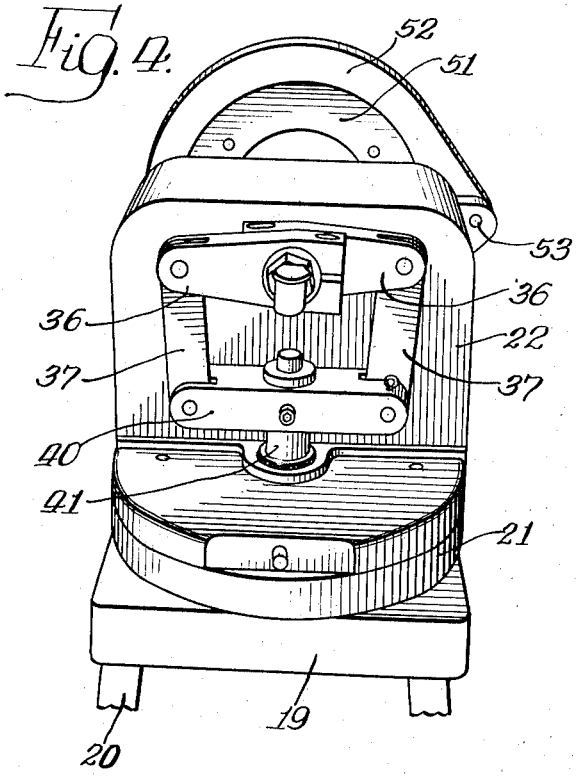
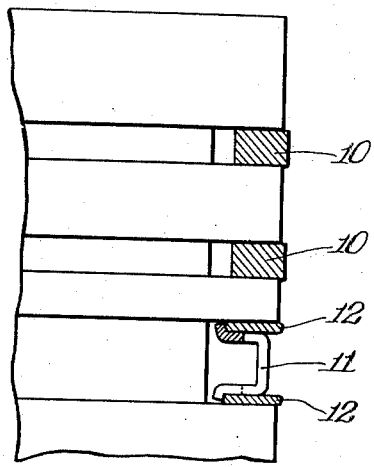
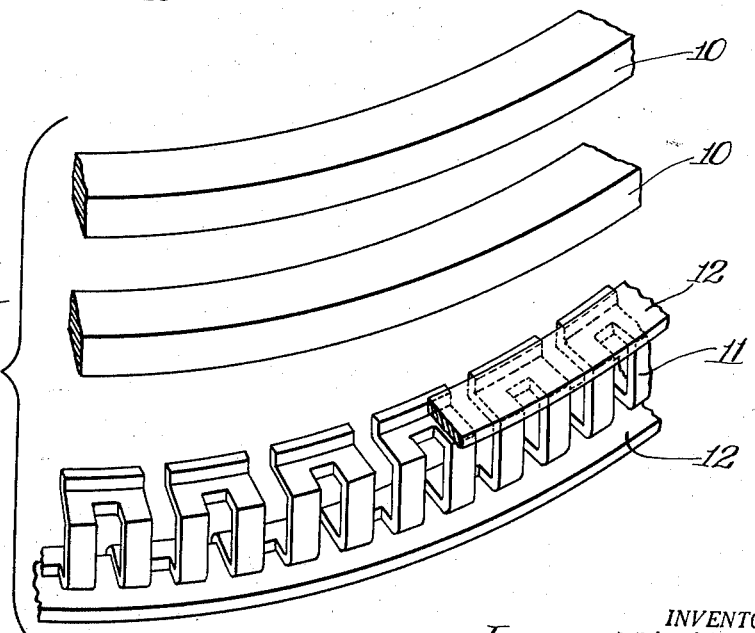
INVENTOR.
Jesse W. Johnson,
BY
Dana, Lindsey, Hibben & Noyes
Attys.

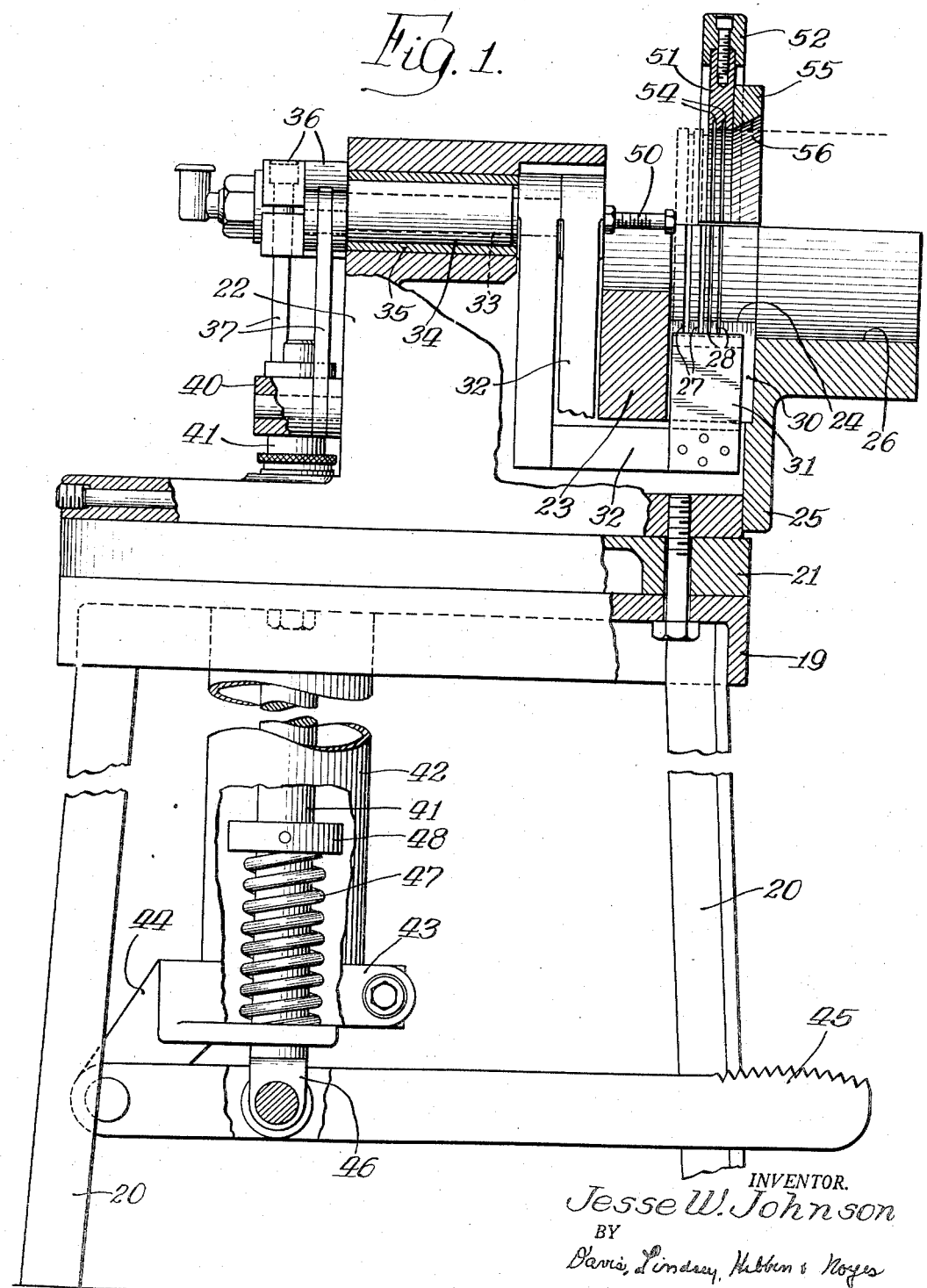

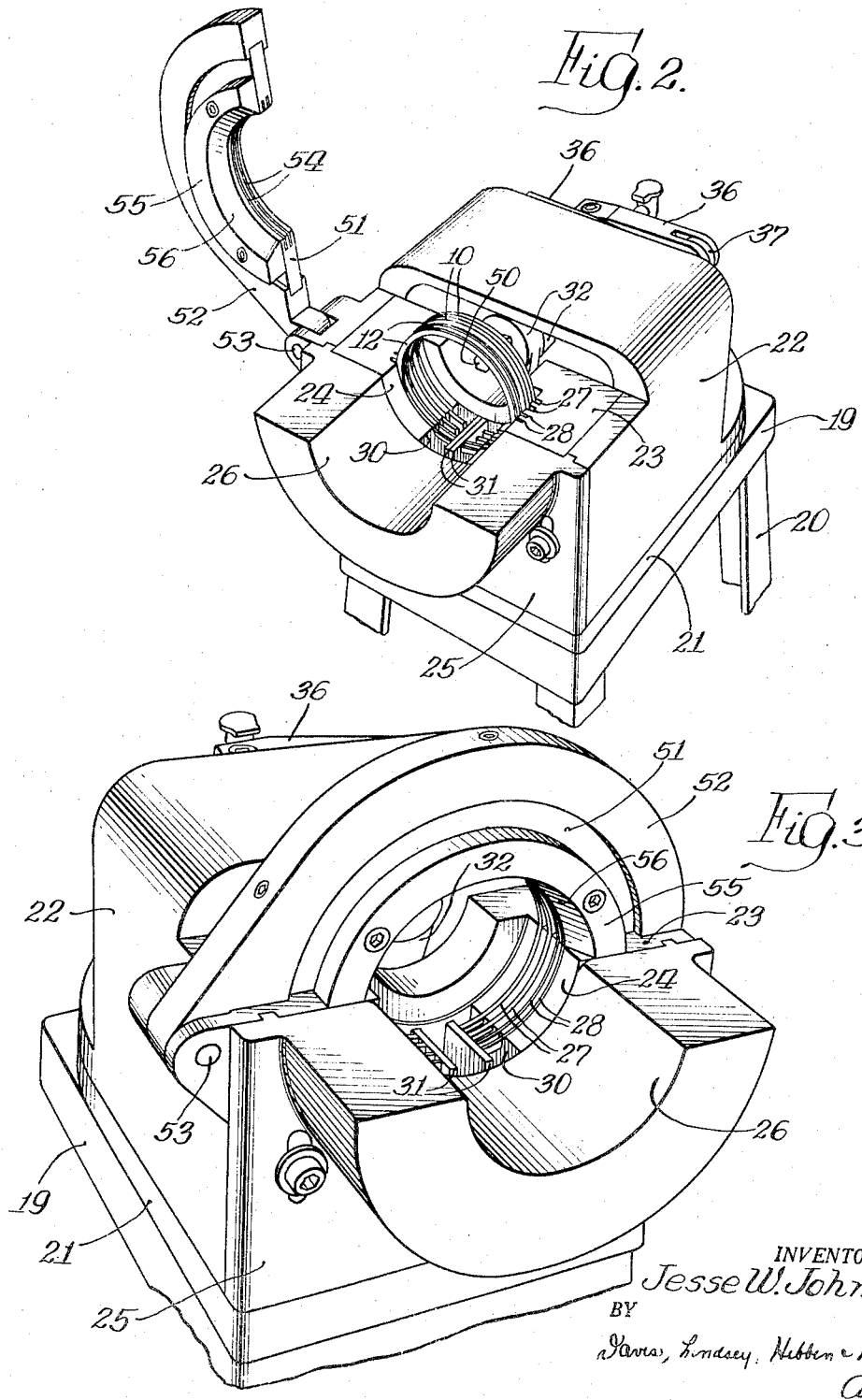

United States Patent Office 2,856,678
Patented Oct. 21, 1958

2,856,678

RING LOADING FIXTURE

Jesse W. Johnson, Richmond, Ind., assignor to Perfect Circle Corporation, Hagerstown, Ind., a corporation of Indiana Application November 9, 1954, Serial No. 467,744

1 Claim. (Cl. 29—222)

The invention relates to a fixture for placing piston rings on pistons.

The general object of the invention is to provide a novel fixture of the foregoing character, which is simple to manipulate, which insures proper positioning of the piston rings on the pistons, and which is inexpensive and rugged in construction.

Another important object is to provide a novel fixture of the foregoing character, which is particularly useful in placing on a piston a ring assembly of the type which includes one or more thin steel rails.

A further object is to provide a novel fixture of the foregoing character, which is arranged so that all of the rings for one piston are placed thereon at the same time.

Other objects and advantages will become apparent from the following description taken in connection with the accompanying drawings, in which:

Fig. 1 is a side elevational view, partially in section, of the ring loading fixture embodying the features of the invention;

Fig. 2 is fragmentary perspective view of the fixture with the rings positioned therein but before they are ready for placing on the piston;

Fig. 3 is a perspective view of the fixture when ready for placing the rings on the piston;

Fig. 4 is a perspective view of the rear side of the fixture;

Fig. 5 is a fragmentary perspective view showing, by way of example, a set of rings for one piston, which may be placed thereon by the fixture; and Fig. 6 is a side elevational view of a piston with the rings shown in Fig. 5 mounted thereon, the rings being shown in section.

The usual type of piston ring utilized on a piston for an internal combustion engine or the like is provided with a gap so that the ring may be spread sufficiently to pass over the head of a piston in moving it into position for insertion in the piston ring groove. In some instances, of course, the gap in the ring also provides for expansion and contraction of the ring when in operative position on a piston within a cylinder. Some forms of rings are sufficiently flexible so that they may be spread readily by hand and placed on the piston. However, some rings are so stiff that they cannot be expanded easily by hand to a sufficient extent to place them on a piston. For this reason it is desirable to provide a fixture by which rings of this character can be spread sufficiently to pass over the head of the piston in moving them into the piston ring groove.

One ring, which in its usual form is of this character, is a compression ring which commonly is made of cast iron and of a rectangular radial cross section. The stiffness of a ring of this type is such that it cannot readily be spread manually and it is therefore desirable to provide a fixture by which it may be spread to place it on the piston. A ring of this type, when spread, does not need to be supported throughout its entire circumference but merely requires support adjacent the gap. The cross sectional characteristics of this type of ring are such that there is no great distortion of the ring out of its normal plane as it is spread.

In many forms of oil rings, there is utilized one or more thin steel rails with a spacer or positioning member in the ring groove of the piston to hold the rail or rails in the desired position. Rails of this type are usually made from a flat straight strip of metal bent edgewise to give it an annular form. As a result of this method of forming and also because it is relatively thin compared to its radial width, such a rail tends to distort out of its normal plane when spread sufficiently to pass over the head of a piston. Such distortion out of its normal plane, if permitted, would prevent it from properly entering the groove in the piston in operative position as determined by the spacer or positioning means therein. It is therefore desirable to hold a rail of this type, when spread in a fixture, throughout its circumference so as to prevent distortion of the rail out of its normal plane. By holding the rail in this manner when it is spread, it can be readily passed over the head of the piston and will enter the groove in proper relation to the spacing or positioning means therein.

In Figs. 5 and 6, I have illustrated a set of rings for a piston which involve the various factors heretofore mentioned. This set of rings is shown merely as an example, but it is evident that the invention is not limited to the particular form or number of the various rings shown in these two figures. For the piston shown herein, two compression rings 10 are employed. These compression rings, as mentioned above, are usually made of cast iron and have a rectangular cross section as is shown in Fig. 6. The compression rings are commonly placed in the upper grooves on a piston as shown therein.

The oil ring illustrated in this instance comprises a combined spacer and expander member 11 positioned within the oil ring groove of the piston and holding a pair of rails 12 at the respective sides of the groove. The combined spacer-expander 11 is shown as being of the circumferentially expansible type and is highly flexible so that it may readily be placed in the groove by hand. The rails 12, however, are quite stiff and would be difficult to spread by hand sufficiently to pass over the head of the piston. Moreover, unless properly supported when spread, they would become distorted out of their normal plane so that they could not readily be inserted into the spaces between the sides of the spacer member 11 and the side walls of the groove.

A ring loading fixture embodying the features of the invention is arranged so that all the rings for one piston may be placed thereon at the same time. In the present instance, while the combined spacer-expander member 11 is placed in the oil ring groove manually, the fixture is arranged to place the two compression rings 10 in their respective grooves and to place the two rails 12 in the oil ring groove at the respective sides thereof in proper relation to the spacer-expander member 11. Generally, a ring loading fixture embodying the features of the invention comprises a support having a cavity to receive the piston and having one or more grooves to receive the ring elements. The fixture also includes means for spreading the ring elements and, because of the support provided by the grooves, they are held against distortion out of their normal planes and will be properly positioned to slip into the grooves in the piston when permitted to contract.

In the preferred embodiment of the invention shown in the drawings, the fixture is adapted to be mounted on a table 19 supported in this instance by four legs 20. Bolted to the top of the table 19 is a base 21 on which is mounted a hollow body member 22. Within the body member 22 there is secured a block 23 having a semicircular cavity 24 to receive the piston. The cavity 24 may be elongated to fully support the piston by means of a face plate 25 secured to the front of the body member 22 and having a semicircular depression 26 therein forming a continuation of the cavity 24. The cavity 24 with its continuation 26 extends horizontally so that the piston will lie on its side therein, and the cavity is preferably made substantially semicircular to adequately support the piston and position it.

The block 23 is provided with one or more grooves to receive the piston ring elements and support them while being spread for placing on the piston. In the present instance, the block 23 is provided with a pair of grooves 27 to receive the compression rings 10, and a pair of narrower grooves 28 to receive the two rails 12, the grooves 27 and 28 of course being axially spaced from each other to properly align with the compression ring grooves and the oil ring groove in the piston when the latter is placed therein.

To spread the rings, means is provided in the support, which is adapted to enter the gaps of the rings and spread them, thus increasing the interior diameter of the rings so that the piston may be inserted therein. To this end, the block 23 is provided with an aperture 30, and within the aperture there is mounted a pair of vanes 31 adapted to enter the gaps of the rings when the latter are placed in the grooves 27 and 28. The vanes 31 normally lie close together and are of such thickness that they may be readily inserted in the gaps of the rings. To spread the rings, the vanes 31 are adapted to be moved away from each other and for this purpose the vanes are mounted on the ends of L-shaped levers 32 which are adapted to be simultaneously moved in opposite directions. Each L-shaped lever 32 has one leg underlying the block 23 and having a vane 31 rigidly secured to its ends, the legs of the two levers being in side-by-side relation.

The other leg of each L-shaped lever 32 extends upwardly, one in front of the other, and are supported on shaft means rotatably mounted in the upper portion of the body member 22. Thus the upwardly extending leg of one lever is mounted on an inner shaft 33 (see Fig. 1) rotatably supported by a tubular shaft 34 to which the upwardly extending leg of the other lever 32 is secured and which is journalled in a bearing 35 mounted in the body member 22. The inner shaft 33 and the tubular shaft 34 both extend rearwardly through the body member, the inner shaft extending farther than the tubular shaft, and on the rear ends of these two shafts are mounted levers 36 which extend generally horizontally in opposite directions from the axis of the shafts. Connected to the outer ends of the levers 36 are links 37 which extend downwardly and are connected to the opposite ends of a cross head 40.

The cross head 40 is rigidly mounted on a pull rod 41 extending downwardly through the base 21 and the table top 19 and slidable vertically therein. Below the table top, a tube 42 is rigidly secured thereto and encloses the pull rod 41. Mounted on the lower end of the tube 42 is a bracket 43 having an arm 44 to which the rear end of a foot pedal 45 is pivotally secured. The pull rod 41 extends downwardly below the lower end of the tube and through the bracket 43 and is provided with a yoke 46 at its lower end pivotally connected to the foot pedal 45 in front of the pivotal mounting of the latter. The pull rod 41 is normally urged upwardly by a spring 47 seated at its lower end on the bracket 43 and engaging at its upper end a collar 48 secured to the pull rod 41.

With the foregoing structure, it will be evident that when the foot pedal 45 is depressed, the pull rod 41 is drawn downwardly, and such movement through the cross head 40, the links 37 and the levers 36 causes the inner shaft 33 and the tubular shaft 34 to be rocked in opposite directions. The L-shaped levers 32 are thus rocked in opposite directions so that the vanes 31 are moved apart to increase the lengths of the gap in the rings and thus spread them. The axis of the shafts 33 and 34 is preferably aligned with the axis of the cavity 24 in the block 23, and a screw 50 may be adjustably mounted on this axis in the front lever 32 to provide an abutment for a piston when it is placed in the cavity 24. The screw thus properly positions the piston so that the grooves therein are aligned with the grooves 27 and 28 in the block 23.

As heretofore mentioned, rings such as the compression rings 10, do not have any great tendency to distort out of their normal plane when spread. This is of course due to the proportion between the radial width of the ring and the axial thickness thereof. Thus rings of this type can be sufficiently held, while being spread, merely by the grooves in the block 23 which is substantially semicircular.

The rails 12, however, present a more difficult problem and because of the small ratio between their thickness and radial width and because of the manner in which they are usually formed as mentioned above, they tend to distort out of their normal plane unless held against such distortion substantially throughout their entire circumference.

To meet this problem, a holding member is provided which is provided with grooves coacting with the grooves 27 to hold the rails 12 against such distortion. In the present instance I have provided a holding member in the form of a semicircular block 51 mounted in and forming part of a cap 52. The cap is swingably mounted, as at 53, on the body member so that the semicircular block 51 may be moved from an out of the way position to an operative position over the block 23. The semicircular block 51 is provided with a pair of grooves 54 of proper size to receive the rails 12 and adapted to be aligned with the grooves 28 when the cap 52 is swung down. Thus the block 23 with its grooves 28 and the block 51 with its grooves 54 provide grooves which extend for substantially the complete circumference of the rails 12. When the rails 12 are then spread by the vanes 31, the rails are held so that they cannot distort out of their normal plane. Consequently when the piston is inserted within the rings in the cavity 24 and the piston abuts the stop screw 50, the compression rings 10 are aligned with the compression ring grooves in the piston, while the rails 12 are properly positioned to enter the spaces between the spacer-expander 11 and the sides of the oil ring groove. On release of the foot pedal 45, the spring 47 forces the pull rod 41 upwardly to move the vanes 31 back toward each other, and the rings thereby contract under their own resiliency and enter the proper position in the grooves in the piston.

As heretofore mentioned, the combined spacer and expander 11 is placed in the oil ring groove of the piston manually before the rails 12 are placed therein. The spacer-expander 11, when the piston is placed in the cavity 24, is of course forced into the oil ring groove at the bottom side of the piston since the piston rests in the cavity. However, in its free form, the spacer-expander 11 may project above the piston a slight amount when the piston is lying on its side in the cavity. This would interfere with the free insertion of the piston inside the rings and under the block 51 when the latter is in its lowered or operative position, since the projecting portion of the spacer-expander 11 would strike the front face of the block 51. The spacer-expander 11 of course is constructed so that it can be compressed sufficiently to lie wholly within the oil ring groove. The block 51 is therefore provided with means which forces any projecting portion of the spacer-expander downwardly into the oil ring groove of the piston as the latter is being inserted through the rings into abutment with the stop screw 50. Thus I provide a semicircular guide 55 mounted on the block 51 and having a tapered inner surface 56 which engages any projecting portion of the spacer-expander 11 as the piston is being inserted. Inward movement of the piston to bring it into abutment with the stop screw 50 will cause the projecting portion of the spacer-expander to be forced into the oil ring groove of the piston by the tapered guide surface 56 so that the piston is readily inserted within the rings to the full extent without trouble from the spacer-expander catching on the lower edge of the block 51.

In use, when the cap 52 is swung to its open position as shown in Fig. 3, the two compression rings 10 and two rails 12 are placed in their respective grooves 27 and 28 in the block 23 with the vanes 31 mounted within the gaps of the rings and rails. The cap 52 is then swung over to its operative position with the upper portions of the rails 12 entering the grooves 54 therein. The operator then depresses the foot pedal 45 which causes the vanes 31 to move apart and spread the rings and rails sufficiently so that the piston can be inserted therein. When the rails are so spread, they are confined substantially throughout their circumference and are thus held in their normal planes.

The spacer-expander 11 has previously been placed in the oil ring groove of the piston and the piston is laid in the cavity 24 and moved inwardly toward the stop screw 50 through the rails and rings. During such movement, if the spacer-expander projects above the piston, the tapered guide surface 56 cams the spacer-expander downwardly until it lies wholly within the oil ring groove so that the piston may then be moved all the way in until it abuts the stop screw 50.

The foot pedal 45 may then be released and the spring 47 moves the foot rod 41 upwardly. The vanes 31 thereupon move toward each other to permit the rings and rails to spring back to their normal unrestricted size. In so doing the compression rings 10 enter the respective compression ring grooves in the piston and the rails 12 both readily move into the oil ring groove in the spaces between the spacer-expander 11 and the respective sides of the groove since the rails are held against distortion. The loading of the rings on the piston is thus completed and the piston may be removed when the cap 52 is swung away from the cavity.

The fixture may be readily adapted for other sizes of pistons and piston rings and for different arrangements thereof. Thus the block 23 which is held in the body member 22 may be replaced with another block having a different arrangement and size of grooves therein, and the block 51 in the cap 52 may be interchanged with another block having grooves of a different size or spacing. The stop screw 50 may also be adjusted to a different position to suit any particular piston. If the diameter of the piston is different, the face plate 25 may be replaced with one having a different diameter cavity 26 therein.

From the foregoing description, it will be apparent that I have provided a novel fixture for loading piston rings on pistons. The device is simple to operate, is sturdy and permits of assembly of the rings on the piston in a minimum of time. The fixture is arranged to place all the rings for a given piston thereon at one time and can be adapted for different sizes and arrangements of rings by replacement of a relatively few parts. The fixture has the particular advantage of preventing distortion of thin piston ring elements such as rails so that they can be placed on a piston as easily as any other type of rings.

I claim:

A fixture for placing a pair of rails of a piston ring assembly in a ring groove in a piston having a spacer mounted in the groove, comprising a support having a semi-circular cavity adapted to receive the piston, said support having a pair of axially spaced grooves to receive said rails and arranged transversely to and opening into said cavity, said support also having an aperture opening into said cavity and intercepting said grooves, means comprising a pair of vanes extending through said aperture and adapted to enter the gaps of the rails, a pair of arms respectively carrying said vanes and extending axially beyond said support, a pair of oppositely movable levers pivoted in said body member coaxially with said cavity and respectively carrying said arms at their ends, and means for simultaneously and oppositely swinging said levers to spread the rails to permit insertion of the piston therein, and a holding member swingably mounted on said support and having a semicircular opening provided with a pair of grooves adapted when said member is in operative position to align with the grooves in said support and hold said rails throughout their circumference to prevent distortion of the rails out of their planes when they are spread and thereby position the rails for entry into the ring groove at the respective sides of the spacer.

References Cited in the file of this patent

UNITED STATES PATENTS

| | | |
|---|---|---|
| 159,508 | Gray | Feb. 9, 1875 |
| 1,325,177 | Strohecker | Dec. 16, 1919 |
| 1,764,146 | Bramberry | June 17, 1930 |